(12) United States Patent
Togashi

(10) Patent No.: US 11,675,891 B2
(45) Date of Patent: Jun. 13, 2023

(54) IMAGE FORMING APPARATUS, NON-TRANSITORY COMPUTER READABLE MEDIUM, AND LINKING SYSTEM

(71) Applicant: FUJIFILM Business Innovation Corp., Tokyo (JP)

(72) Inventor: Takuya Togashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 92 days.

(21) Appl. No.: 17/318,471

(22) Filed: May 12, 2021

(65) Prior Publication Data

US 2022/0201156 A1 Jun. 23, 2022

(30) Foreign Application Priority Data

Dec. 22, 2020 (JP) .............................. JP2020-212716

(51) Int. Cl.
*G06F 21/41* (2013.01)
*H04L 9/40* (2022.01)
*H04N 1/32* (2006.01)
*H04N 1/44* (2006.01)

(52) U.S. Cl.
CPC .......... *G06F 21/41* (2013.01); *H04L 63/0838* (2013.01); *H04L 63/0846* (2013.01); *H04L 63/104* (2013.01); *H04N 1/32117* (2013.01); *H04N 1/4413* (2013.01)

(58) Field of Classification Search
CPC . G06F 21/41; H04L 63/0838; H04L 63/0846; H04L 63/104; H04N 1/32117; H04N 1/4413
See application file for complete search history.

(56) References Cited

U.S. PATENT DOCUMENTS

| | | | | |
|---|---|---|---|---|
| 2008/0297829 | A1* | 12/2008 | Paek ................... | G03G 15/5091 358/1.15 |
| 2009/0183243 | A1* | 7/2009 | Ruppert ............... | H04L 63/0815 707/E17.014 |
| 2010/0186063 | A1* | 7/2010 | Oba .................... | G03G 15/5075 726/1 |
| 2012/0036220 | A1* | 2/2012 | Dare ....................... | H04L 67/04 709/217 |
| 2013/0033714 | A1* | 2/2013 | Nakagawa ............. | G06F 3/1254 358/1.9 |

(Continued)

FOREIGN PATENT DOCUMENTS

| | | | | |
|---|---|---|---|---|
| EP | 1953599 A1 * | 8/2008 | ......... | G03G 15/5091 |
| JP | 2017-072890 A | 4/2017 | | |

OTHER PUBLICATIONS

OpenID. "OpenID Connect Dynamic Client Registration 1.0incorporating errata set 1", Nov. 2014. (Year: 2014).*

(Continued)

*Primary Examiner* — Michael Simitoski
(74) *Attorney, Agent, or Firm* — Oliff PLC

(57) ABSTRACT

An image forming apparatus includes: a processor configured to: execute a linking application for a linkage with a specific service, to receive a linkage request from a user through the specific service; and perform an authenticating process that authenticates a user who uses the image forming apparatus, using user information on the user who uses the specific service linked as a result of an approval of the received linkage request.

15 Claims, 14 Drawing Sheets

(56) References Cited

U.S. PATENT DOCUMENTS

| | | | | |
|---|---|---|---|---|
| 2014/0240753 | A1* | 8/2014 | Anno | G06F 3/1236 |
| | | | | 358/1.15 |
| 2015/0237043 | A1* | 8/2015 | Nishi | H04L 63/0807 |
| | | | | 726/9 |
| 2016/0261771 | A1* | 9/2016 | Fujii | H04N 1/00509 |
| 2018/0091506 | A1* | 3/2018 | Chow | H04L 67/567 |
| 2018/0248866 | A1* | 8/2018 | Zhang | H04L 63/0815 |
| 2018/0300090 | A1* | 10/2018 | Lin | G06F 3/1204 |
| 2018/0335990 | A1* | 11/2018 | Nishikawa | H04L 63/102 |
| 2019/0036936 | A1* | 1/2019 | Tokuchi | H04L 63/08 |
| 2019/0114412 | A1* | 4/2019 | Zhang | G06F 21/41 |
| 2020/0213297 | A1* | 7/2020 | Suraparaju | H04L 63/0892 |
| 2020/0233619 | A1* | 7/2020 | Hosoda | G06F 3/1239 |
| 2020/0310709 | A1* | 10/2020 | Suraparaju | G06F 21/41 |
| 2021/0081154 | A1* | 3/2021 | Yasuda | H04L 63/08 |
| 2021/0099874 | A1* | 4/2021 | Suraparaju | H04W 12/0471 |
| 2021/0203792 | A1* | 7/2021 | Kashihara | H04N 1/00962 |
| 2021/0336950 | A1* | 10/2021 | Miyamoto | H04N 1/4426 |
| 2021/0377277 | A1* | 12/2021 | Soneda | H04L 63/104 |
| 2022/0147627 | A1* | 5/2022 | Ogawa | G06F 21/606 |

OTHER PUBLICATIONS

OpenID. "OpenID Connect Core 1.0 incorporating errata set 1", Nov. 2014. (Year: 2014).*

Facebook. Facebook Login for Devices, Sep. 2020. <https://web.archive.org/web/20200930003718/https://developers.facebook.com/docs/facebook-login/for-devices/>. (Year: 2020).*

* cited by examiner

IMAGE FORMING APPARATUS, NON-TRANSITORY COMPUTER READABLE MEDIUM, AND LINKING SYSTEM

CROSS-REFERENCE TO RELATED APPLICATIONS

This application is based on and claims priority under 35 USC 119 from Japanese Patent Application No. 2020-212716 filed Dec. 22, 2020.

BACKGROUND

(i) Technical Field

The present disclosure relates to an image forming apparatus, a non-transitory computer readable medium, and a linking system.

(ii) Related Art

JP-A-2017-072890 discloses a service providing system capable of implementing a state where a service is easily usable by an operation of an image forming apparatus.

SUMMARY

When an image forming apparatus is used, a user authentication may be performed to determine if a user is permitted to use the image forming apparatus.

Here, social network service (SNS) has been recently used in business. Further, user information on users who use the SNS are registered in a management server that manages the SNS. When the user authentication is performed using the user information, it is possible to reduce the burden of, for example, managing users who are permitted to use the image forming apparatus by manually entering the user information to the image forming apparatus.

Accordingly, aspects of non-limiting embodiments of the present disclosure relate to performing a user authentication in an image forming apparatus using user information of a specific service.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: a processor configured to: execute a linking application for a linkage with a specific service, to receive a linkage request from a user through the specific service; and perform an authenticating process that authenticates a user who uses the image forming apparatus, using user information on the user who uses the specific service linked as a result of an approval of the received linkage request.

BRIEF DESCRIPTION OF THE DRAWINGS

Exemplary embodiment(s) of the present disclosure will be described in detail based on the following figures, wherein.

DETAILED DESCRIPTION

Hereinafter, a linking system 10 according to an exemplary embodiment of the present disclosure will be described.

Figure 1:
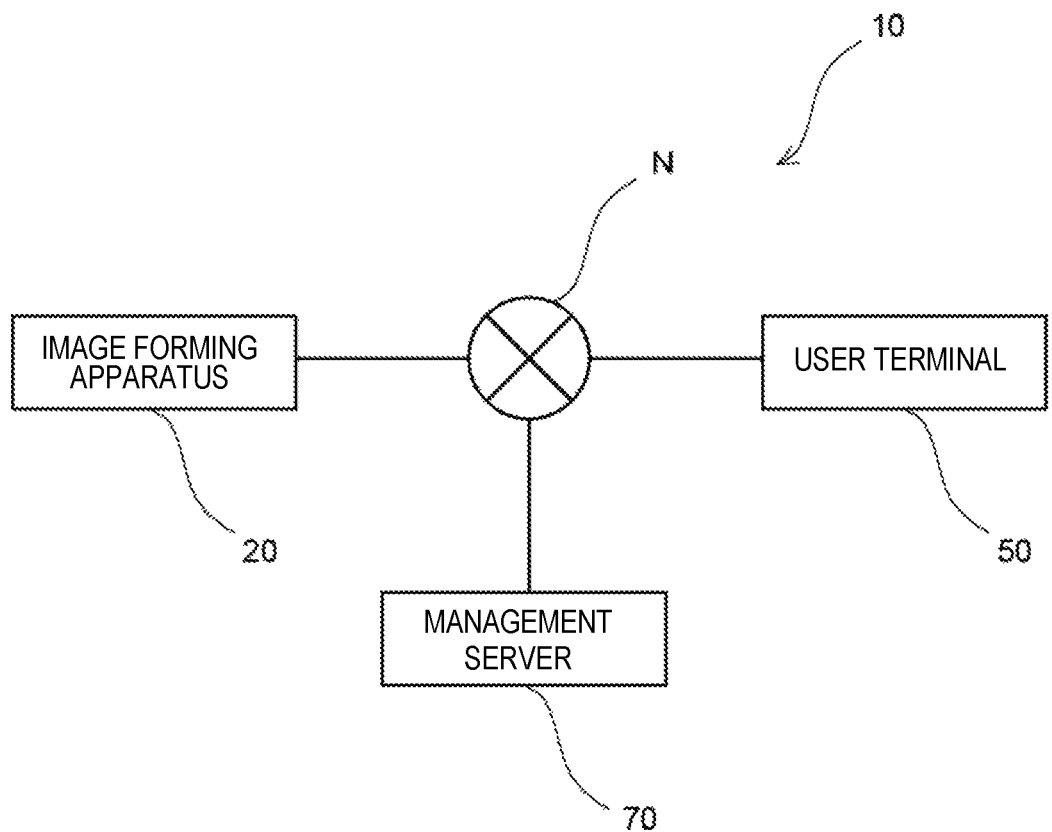
FIG. 1 is a diagram illustrating a schematic configuration of a linking system.

FIG. 1 is a diagram illustrating a schematic configuration of the linking system 10. As illustrated in FIG. 1, the linking system 10 includes an image forming apparatus 20, a user terminal 50, and a management server 70. The image forming apparatus 20, the user terminal 50, and the management server 70 are connected to each other via a network N, and are able to communicate with each other. As the network N, for example, the Internet, a local area network (LAN), a wide area network (WAN) or the like is applied.

The image forming apparatus 20 performs an authentication for authenticating a user who is permitted to use the image forming apparatus 20 (hereinafter, referred to as "user authentication"), using user information on a user who uses a linked SNS (hereinafter, referred to as "SNS user information"). The image forming apparatus 20 is an example of an "own apparatus", the SNS is an example of a "specific service", and the SNS user information is an example of "user information".

The user terminal 50 is a terminal that is capable of using the SNS, and the SNS and the image forming apparatus 20 are linked with each other through the terminal. Here, linking the SNS and the image forming apparatus 20 with each other indicates linking the management server 70 and the image forming apparatus 20 to each other by the SNS to enable the user authentication of the image forming apparatus 20 using the SNS user information.

The management server 70 performs, for example, the management of the SNS user information that includes an identification (ID) of a user who uses the SNS, a password used for a user authentication of the SNS and others, and the management of various processes performed by the SNS. The management server 70 is an example of a "terminal of the specific service". Hereinafter, the ID of the user who uses the SNS will be referred to as an "SNS user ID", and the password used for the user authentication of the SNS will be referred to as an "SNS password".

Figure 2:
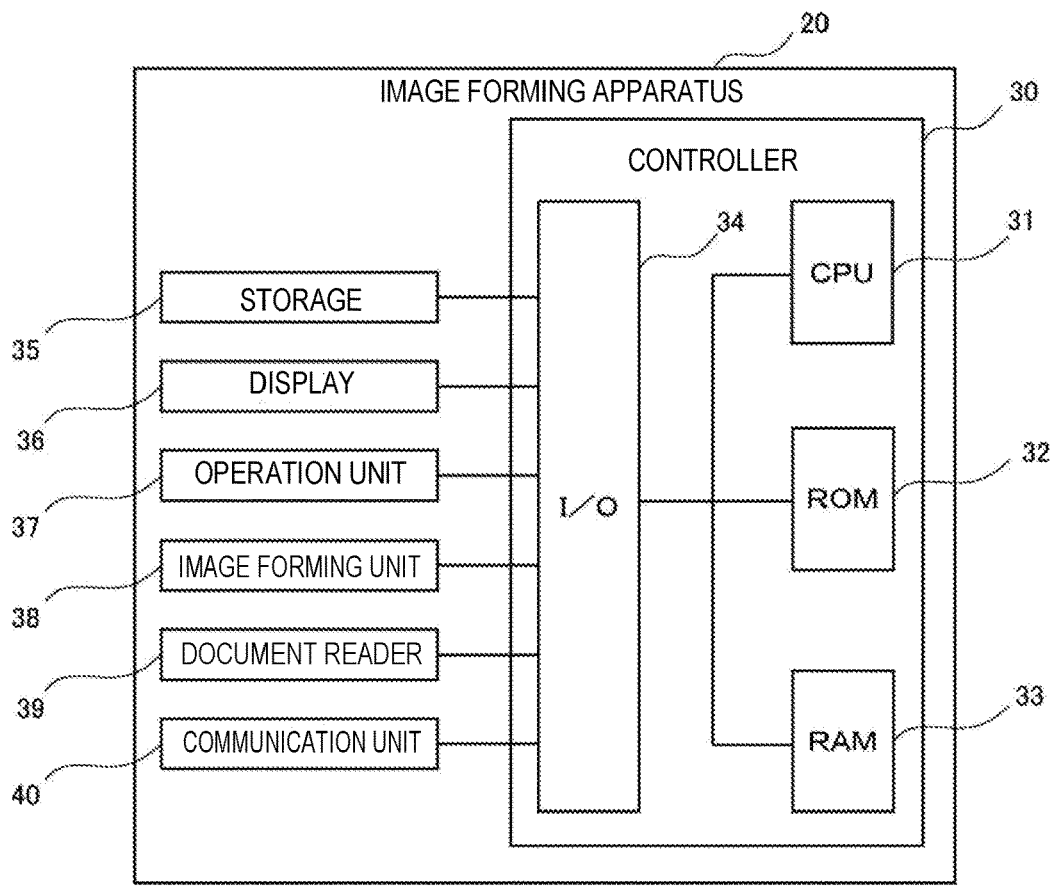
FIG. 2 is a block diagram illustrating a hardware configuration of an image forming apparatus.

FIG. 2 is a block diagram illustrating a hardware configuration of the image forming apparatus 20.

As illustrated in FIG. 2, the image forming apparatus 20 includes a controller 30 that controls the operation of the image forming apparatus 20. In the controller 30, a central processing unit (CPU) 31, a read only memory (ROM) 32, a random access memory (RAM) 33, and an input/output interface (I/O) 34 are connected to each other for a communication via a bus. The CPU 31 is an example of a "processor".

The CPU 31 is a central processing unit, and executes various programs or controls each unit. That is, the CPU 31 reads programs from the ROM 32 or a storage 35 to be described later, and executes the programs using the RAM 33 as a work area. The CPU 31 controls each unit or executes various arithmetic processes as described above, according to the programs recorded in the ROM 32 or the storage 35. In the present exemplary embodiment, the ROM 32 or the storage 35 stores at least an image forming program for executing a first linking process and a first authenticating process to be described later. The image forming program may be installed in advance in the image forming apparatus 20, may be stored in a nonvolatile storage medium, may be distributed via the network N, or may be appropriately installed in the image forming apparatus 20. As examples of the nonvolatile storage medium, a CD-ROM, a magneto-optical disc, a hard disk drive (HDD), a DVD-ROM, a flash memory, a memory card and others are considered.

The ROM 32 stores various programs and various data. The RAM 33 which serves as a work area temporarily stores programs or data.

The storage 35, a display 36, an operation unit 37, an image forming unit 38, a document reader 39, and a communication unit 40 are connected to the I/O 34. These components are able to communicate with the CPU 31 via the I/O 34.

The storage 35 is implemented by a storage device such as an HDD, a solid state drive (SSD), a flash memory or the like, and stores various programs and various data.

As the display 36, for example, a liquid crystal display (LCD) or an organic electroluminescence (EL) display or the like is used. The display 36 includes a touch panel in an integrated form.

The operation unit 37 is provided with various operation keys such as numeric keys, a start key and others.

The display 36 and the operation unit 37 receive various instructions from a user of the image forming apparatus 20. The various instructions include, for example, an instruction to start reading a document, an instruction to start copying a document, and others. The display 36 displays various types of information such as a result of a process executed in response to an instruction received from the user, a notification of the process, and others.

The document reader 39 takes documents placed on a paper feed tray of an automatic document feeder (not illustrated) provided above the image forming apparatus 20 one by one, and optically reads the taken document to obtain image information. Alternatively, the document reader 39 optically reads a document placed on a document table such as a platen glass or the like, to obtain image information.

The image forming unit 38 forms an image based on the image information obtained from the reading by the document reader 39 or image information obtained from an external personal computer (PC) or the like connected via the network N, on a recording medium such as a paper or the like.

The communication unit 40 is an interface for communicating with other devices such as the user terminal 50, the management server 70 and others. For the communication, for example, a wired communication standard such as the Ethernet (registered trademark), the FDDI or the like, or a wireless communication standard such as 4G, 5G, Wi-Fi (registered trademark) or the like is used.

When the image forming program described above is executed, the image forming apparatus 20 executes a process based on the image forming program using the hardware resources described above.

Figure 3:
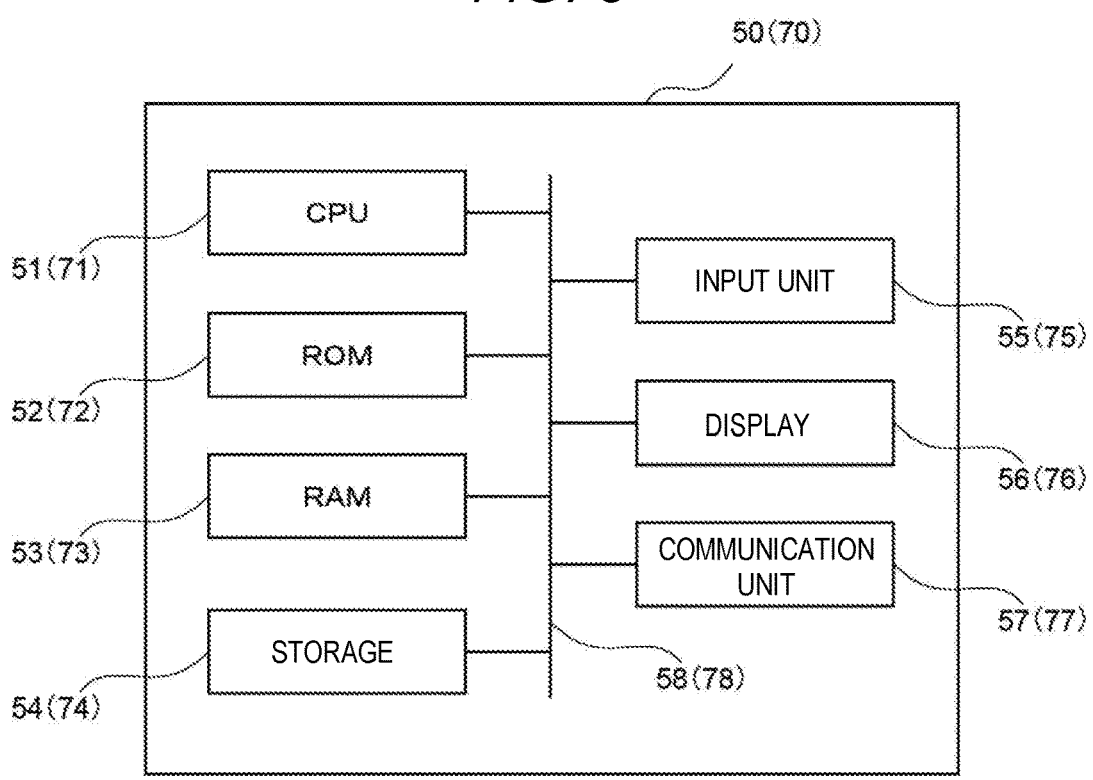
FIG. 3 is a block diagram illustrating a hardware configuration of a user terminal and a management server.

Subsequently, the hardware configuration of the user terminal 50 and the management server 70 will be described. FIG. 3 is a block diagram illustrating the hardware configuration of the user terminal 50 and the management server 70. As the user terminal 50 and the management server 70, for example, a general-purpose computer device such as a server computer, a personal computer or the like is applied. Further, for example, a mobile terminal such as a smart phone, a tablet terminal or the like may be applied to the user terminal 50.

Since the user terminal 50 and the management server 70 basically have the configuration of a general computer, the management server 70 will be described below as a representative.

As illustrated in FIG. 3, the management server 70 includes a CPU 71, a ROM 72, a RAM 73, a storage 74, an input unit 75, a display 76, and a communication unit 77. These components are connected to each other for a communication via a bus 78. The CPU 71 is an example of a "processor".

The CPU 71 is a central processing unit, and executes various programs or controls each unit. That is, the CPU 71 reads programs from the ROM 72 or the storage 74, and executes the programs using the RAM 73 as a work area. The CPU 71 controls each unit and performs various arithmetic processes according to the programs recorded in the ROM 72 or the storage 74.

The ROM 72 stores various programs and various data. The RAM 73 which serves as a work area temporarily stores programs or data.

The storage 74 is implemented by a storage device such as an HDD, an SSD, a flash memory or the like, and stores various programs including an operating system, and various data.

The input unit 75 includes a pointing device such as a mouse, and a keyboard, and is used for performing various inputs.

The display 76 is, for example, a liquid crystal display, and displays various types of information. The display 76 may adopt a touch panel system, and function as the input unit 75.

The communication unit 77 is an interface for communicating with other devices such as the image forming apparatus 20 and the user terminal 50. For the communication, for example, a wired communication standard such as the Ethernet (registered trademark), the FDDI or the like, or a wireless communication standard such as 4G, 5G, Wi-Fi (registered trademark) or the like is used.

Figure 4:
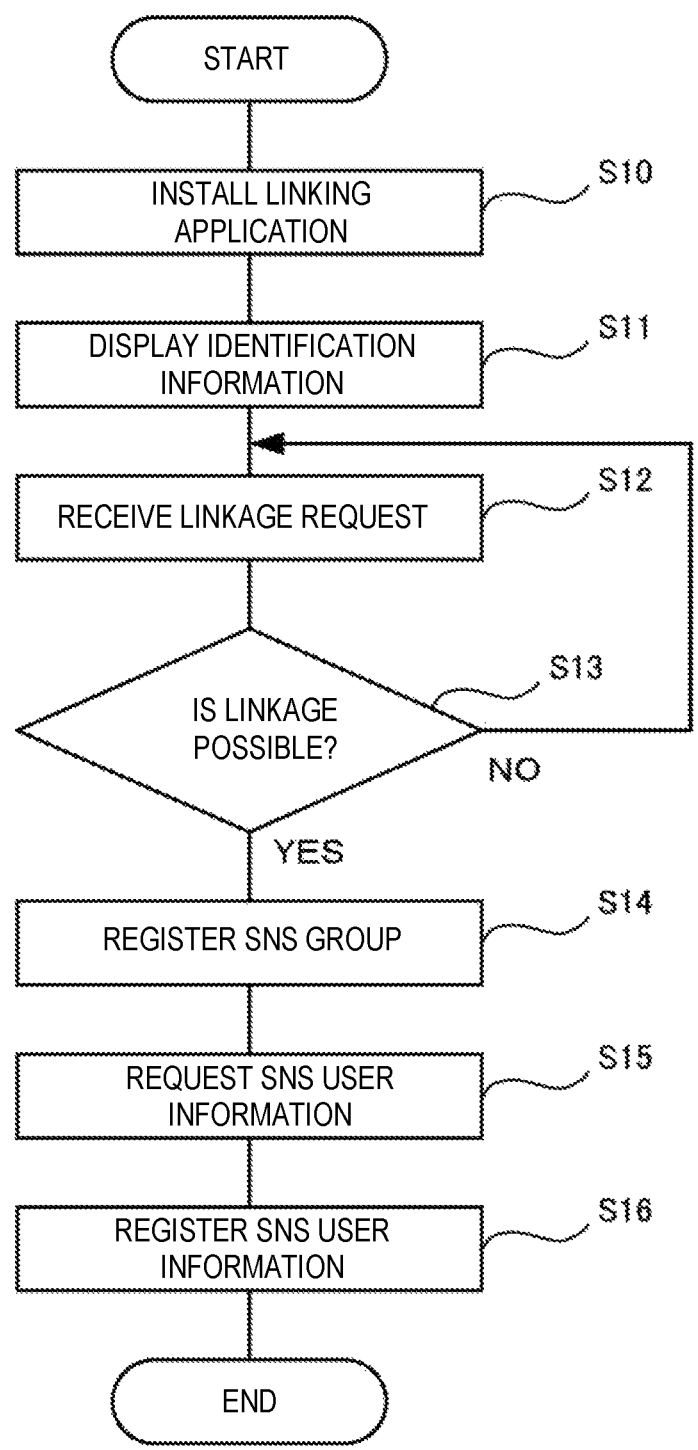
FIG. 4 is a flowchart of a first linking process.

FIG. 4 is a flowchart of a process executed by the image forming apparatus 20, in the linking process for linking the SNS and the image forming apparatus 20 with each other (hereinafter, referred to as a "first linking process"). The first linking process is performed in the manner that the CPU 31 reads the image forming program from the ROM 32 or the storage 35, and deploys the program in the RAM 33 to execute the program.

In step S10 illustrated in FIG. 4, the CPU 31 installs a linking application for the linkage with the SNS into the image forming apparatus 20. Then, the process proceeds to step S11.

As an example, the install of the linking application into the image forming apparatus 20 is performed along the following flow.

Figure 5:
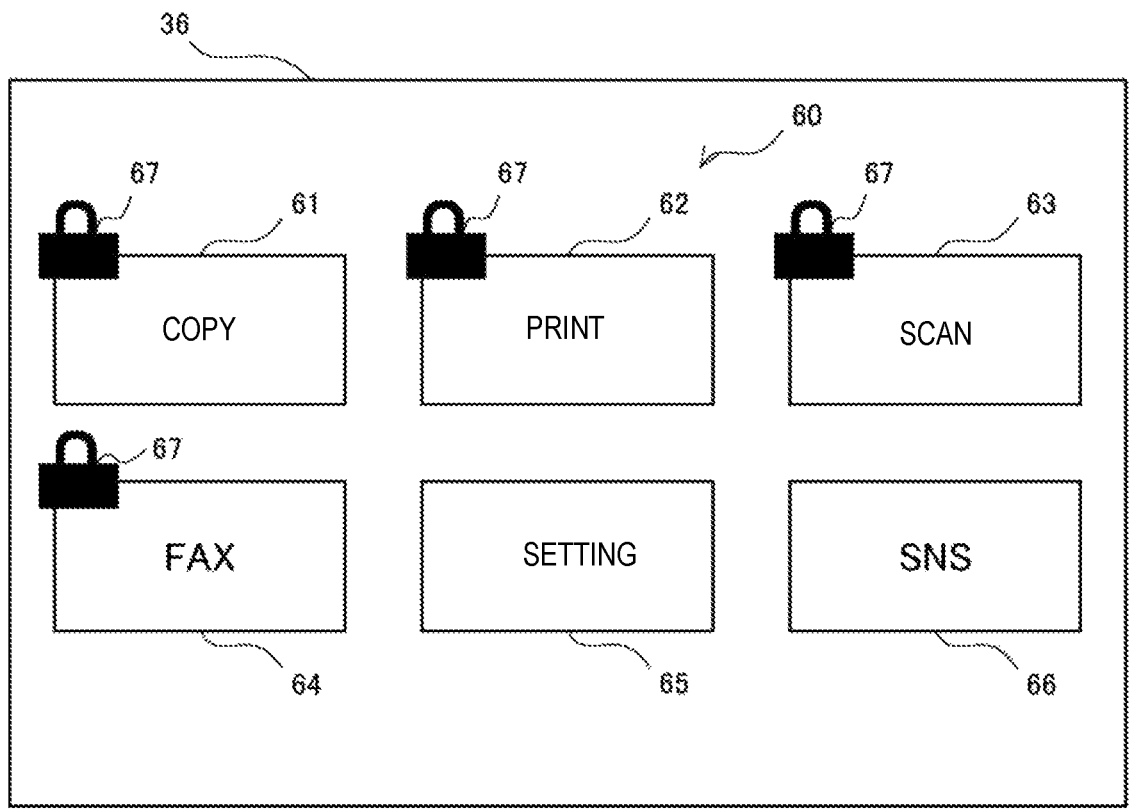
FIG. 5 is a first display example displayed on a display of the image forming apparatus.

FIG. 5 is a first display example displayed on the display 36 of the image forming apparatus 20. In the display example illustrated in FIG. 5, a home screen 60 is displayed to represent various functions provided in the image forming apparatus 20.

The home screen 60 displays, as various functions, a copy button 61 for executing a copy function, a print button 62 for executing a print function, a scan button 63 for executing a scan function, a fax button 64 for executing a fax function, a setting button 65 for executing a setting function, and an SNS button 66 for executing an SNS function.

In the setting function, use settings related to the use of the image forming apparatus 20 may be performed, such as, for example, changing the font size displayed on the display 36, and editing the various functions displayed on the home screen 60.

In the SNS function, as an example, the linking process for linking the SNS and the image forming apparatus 20 with each other, and the user authentication of the image forming apparatus 20 using the SNS user information may be performed.

When the buttons for executing the various functions displayed on the home screen 60 are operated, the image forming apparatus 20 executes the various functions that correspond to the operated buttons. However, when any of the copy button 61, the print button 62, the scan button 63, and the fax button 64 is operated before the user authentication, the CPU 31 of the image forming apparatus 20 does not execute the various functions that correspond to the operated buttons. Meanwhile, in FIG. 5, a key mark 67 is displayed on the upper left of each of the buttons of which various functions are not executed by the image forming apparatus 20.

That is, the copy function, the print function, the scan function, and the fax function are executable after the user authentication. Meanwhile, the setting function and the SNS function are executable before the user authentication.

Figure 6:
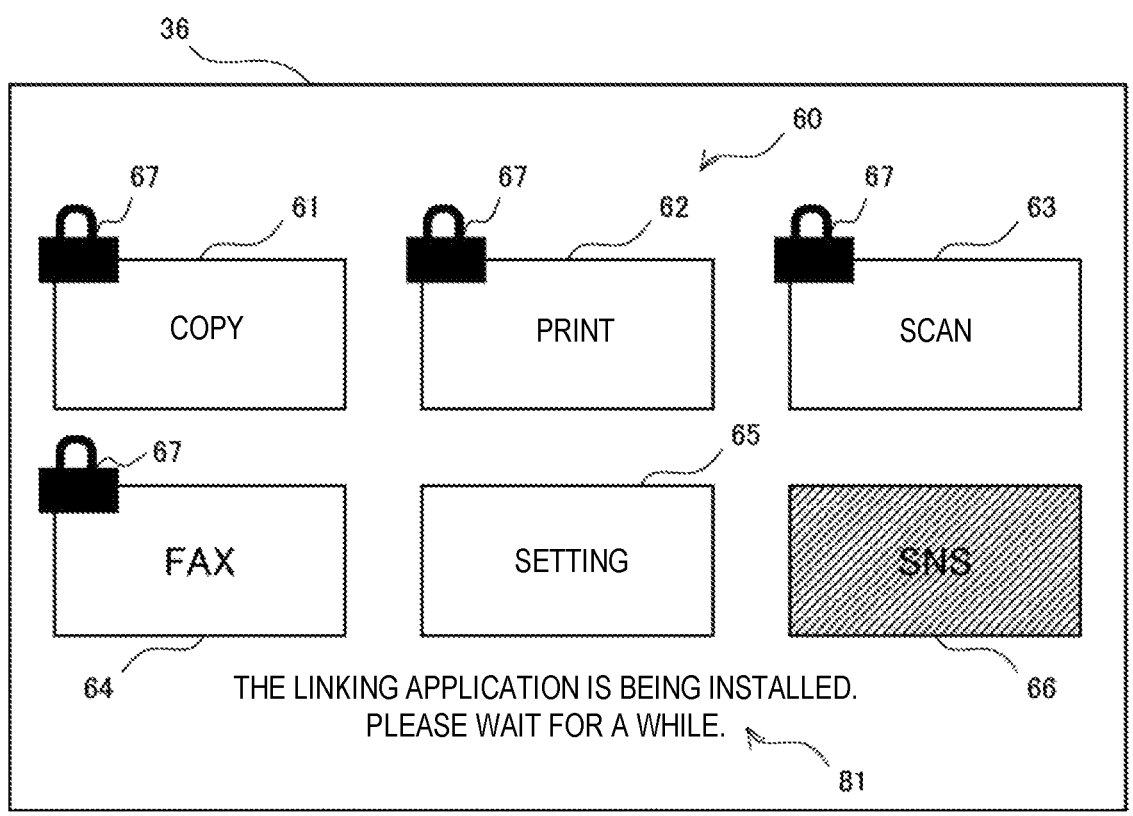
FIG. 6 is a second display example displayed on the display of the image forming apparatus.

FIG. 6 is a second display example displayed on the display 36 of the image forming apparatus 20. The display example illustrated in FIG. 6 represents a state after the SNS button 66 in the display example illustrated in FIG. 5 is operated. In FIG. 6, the frame of the SNS button 66 is filled with diagonal hatching lines to represent that the SNS button 66 has been operated.

Further, in FIG. 6, message information 81 is displayed at the lower portion of the screen of the display 36 to represent a message to the user. As an example, FIG. 6 displays the message information 81 representing that "The linking application is being installed. Please wait for a while". After the linking application is installed into the image forming apparatus 20, the CPU 31 changes the display of the display 36 to the display example illustrated in FIG. 7.

Referring back to FIG. 4, in step S11, the CPU 31 causes the display 36 to display identification information that identifies the image forming apparatus 20 to be linked with the SNS. Then, the process proceeds to step S12. The identification information is information that may uniquely identify the image forming apparatus 20 to be linked with the SNS, and is, for example, an "image forming apparatus ID" in the present exemplary embodiment.

Figure 7:
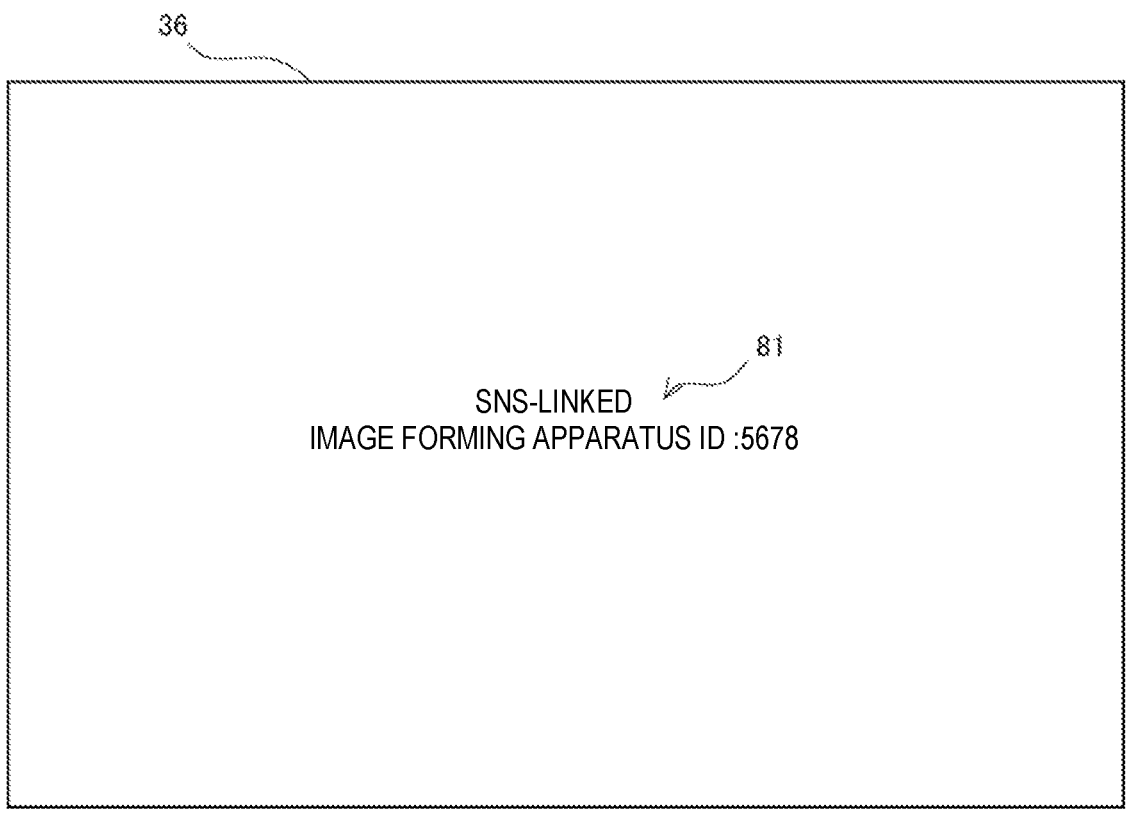
FIG. 7 is a third display example displayed on the display of the image forming apparatus.

FIG. 7 is a third display example displayed on the display 36 of the image forming apparatus 20. The display example illustrated in FIG. 7 represents a state after the linking application is installed into the image forming apparatus 20. In FIG. 7, "SNS-linked image forming apparatus ID: 5678"

is displayed as the message information 81 at the center of the screen of the display 36. As a result, the user who sees the display example of FIG. 7 may recognize the identification information of "5678".

Referring back to FIG. 4, in step S12, the CPU 31 executes the linking application, and receives a linkage request from the user through the SNS. Then, the process proceeds to step S13. While the details will be described later, the linkage request includes at least identification information and group information that may uniquely identify an SNS group. Meanwhile, although not illustrated, during receiving of the linkage request, the CPU 31 may cause the display 36 to display, for example, the text "Receiving a linkage request", in addition to the message information 81 illustrated in FIG. 7, in order to show that the linkage request is being received.

In step S13, the CPU 31 determines whether the linkage with the SNS is possible based on the received linkage request, and when it is determined that the linkage is possible (step S13: YES), the process proceeds to step S14. Meanwhile, when the CPU 31 determines that the linkage is not possible (step S13: NO), the process returns to step S12. As an example, when the identification information included in the received linkage request matches the information displayed on the display 36 in step S11, the CPU 31 approves the linkage request in step S13, and determines that the linkage is possible. Further, when it is determined in step S13 that the linkage is possible, the CPU 31 transmits a notification that the linkage is possible, to the management server 70.

In step S14, the CPU 31 registers a group of the user using the SNS that corresponds to the group information included in the received linkage request (hereinafter, referred to as an "SNS group"). Then, the process proceeds to step S15. As an example, the CPU 31 stores the SNS group (for example, Group A) that corresponds to the group information, in the storage 35.

In step S15, the CPU 31 requests the SNS user information of the user who belongs to the SNS group registered in step S14, from the management server 70. Then, the process proceeds to step S16.

In step S16, the CPU 31 registers the received SNS user information. As an example, the CPU 31 associates the received SNS user information with the SNS group stored in the storage 35, and stores the associated information as list information indicating a list of users who use the image forming apparatus 20 in the storage 35. Then, the process is ended. Here, the SNS user information transmitted from the management server 70 to the image forming apparatus 20 includes at least information that may uniquely identify the user who uses the SNS, and includes, for example, "SNS user ID" in the present exemplary embodiment.

Figure 8:
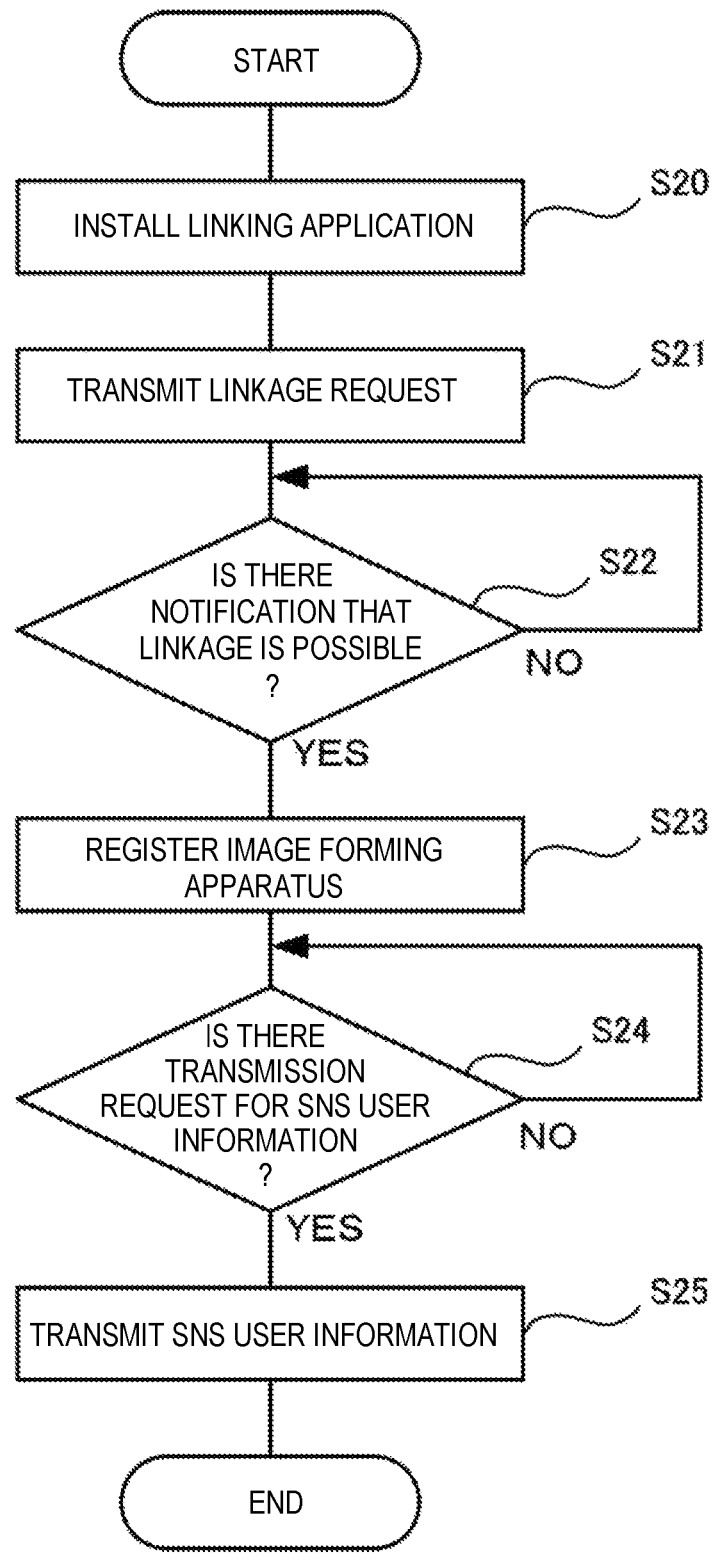
FIG. 8 is a flowchart of a second linking process.

FIG. 8 is a flowchart of a process executed by the management server 70 in the linking process (hereinafter, referred to as a "second linking process"). The second linking process is performed in the manner that the CPU 71 reads the program from the ROM 72 or the storage 74, and deploys the program in the RAM 73 to execute the program.

In step S20 illustrated in FIG. 8, the CPU 71 installs the linking application into the management server 70. Then, the process proceeds to step S21.

As an example, the install of the linking application into the management server 70 is performed along the following flow.

Figure 9:
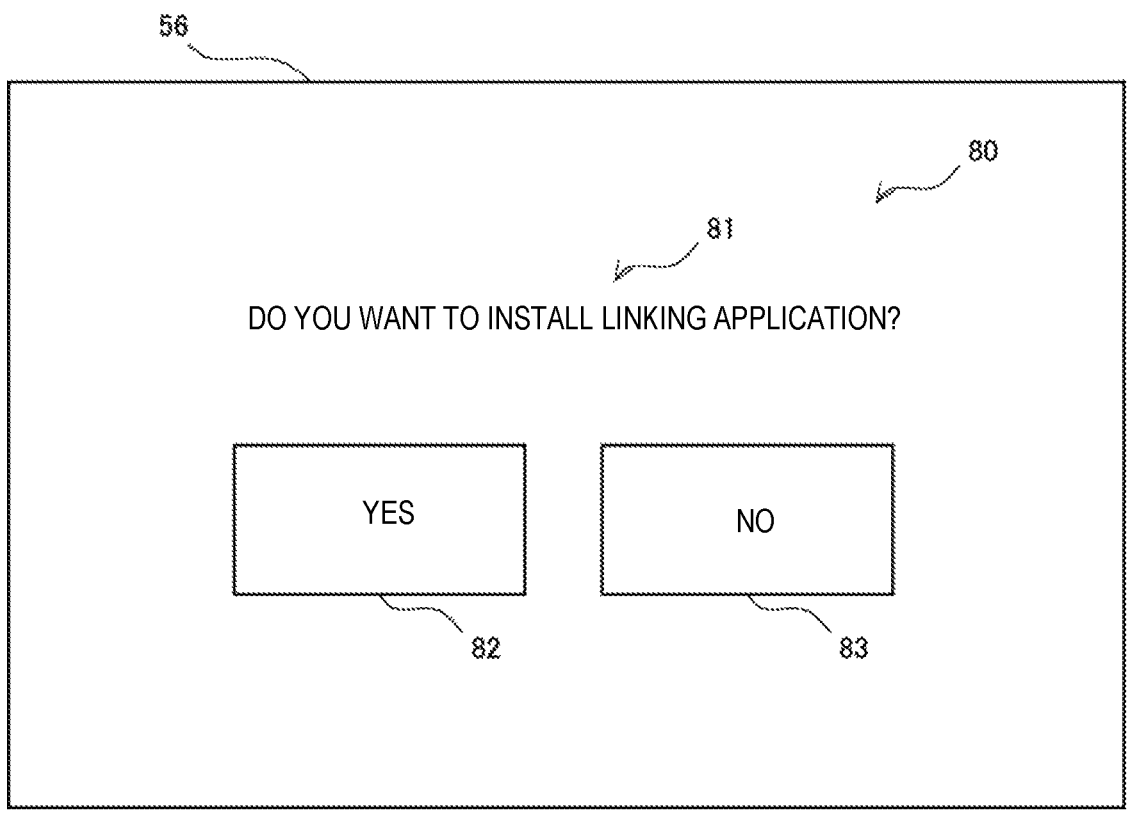
FIG. 9 is a first display example displayed on a display of the user terminal.

FIG. 9 is a first display example displayed on a display 56 of the user terminal 50. In the display example illustrated in FIG. 9, an install screen 80 for installing the linking application into the management server 70 is displayed. As an example, the CPU 71 causes the display 56 to display the install screen 80 when a predetermined icon displayed on the screen of the display 56 is selected using an input unit 55.

The install screen 80 displays the message information 81, a YES button 82, and a NO button 83. As an example, in FIG. 9, a message "Do you want to install the linking application?" is displayed as the message information 81. Then, when the YES button 82 is operated during the display of the display example illustrated in FIG. 9, the CPU 71 starts the install of the linking application into the management server 70. Meanwhile, when the NO button 83 is operated during the display of the display example illustrated in FIG. 9, the CPU 71 stops the install of the linking application, and causes the screen of the display 56 to shift to predetermined display contents.

Referring back to FIG. 8, in step S21, the CPU 71 transmits a linkage request to the image forming apparatus 20. Then, the process proceeds to step S22.

In step S22, the CPU 71 determines whether the notification that the linkage is possible has been acquired from the image forming apparatus 20, and when it is determined that the notification has been acquired (step S22: YES), the process proceeds to step S23. Meanwhile, when it is determined that the notification has not been acquired (step S22: NO), the CPU 71 waits until the notification is acquired.

In step S23, the CPU 71 registers the image forming apparatus 20 that has transmitted the notification that the linkage is possible. Then, the process proceeds to step S24. As an example, the CPU 71 stores the SNS group that corresponds to the group information included in the linkage request (e.g.: Group A), and the image forming apparatus 20 that has transmitted the notification that the linkage is possible in response to the linkage request, in association with each other in the storage 74.

Here, when the SNS group is registered in the image forming apparatus 20 in step S14 illustrated in FIG. 4, and the image forming apparatus 20 is registered in the management server 70 in step S23, the linkage between the SNS and the image forming apparatus 20 is completed. As a result, the user who belongs to the SNS group registered in the image forming apparatus 20 may perform the user authentication of the image forming apparatus 20 using the SNS user information of the user.

In step S24, the CPU 71 determines whether a transmission request for the SNS user information of the user who belongs to the SNS group registered in the image forming apparatus 20 has been acquired, and when it is determined that the transmission request has been acquired (step S24: YES), the process proceeds to step S25. Meanwhile, when it is determined that the transmission request has not been acquired (step S24: NO), the CPU 71 waits until the transmission request is acquired.

In step S25, the CPU 71 extracts the SNS user information that corresponds to the transmission request acquired in step S24 from the storage 74, and transmits the extracted SNS user information to the image forming apparatus 20. Then, the process is ended.

Next, a display example displayed on the display 56 of the user terminal 50 during the linking process will be described.

Figure 10:
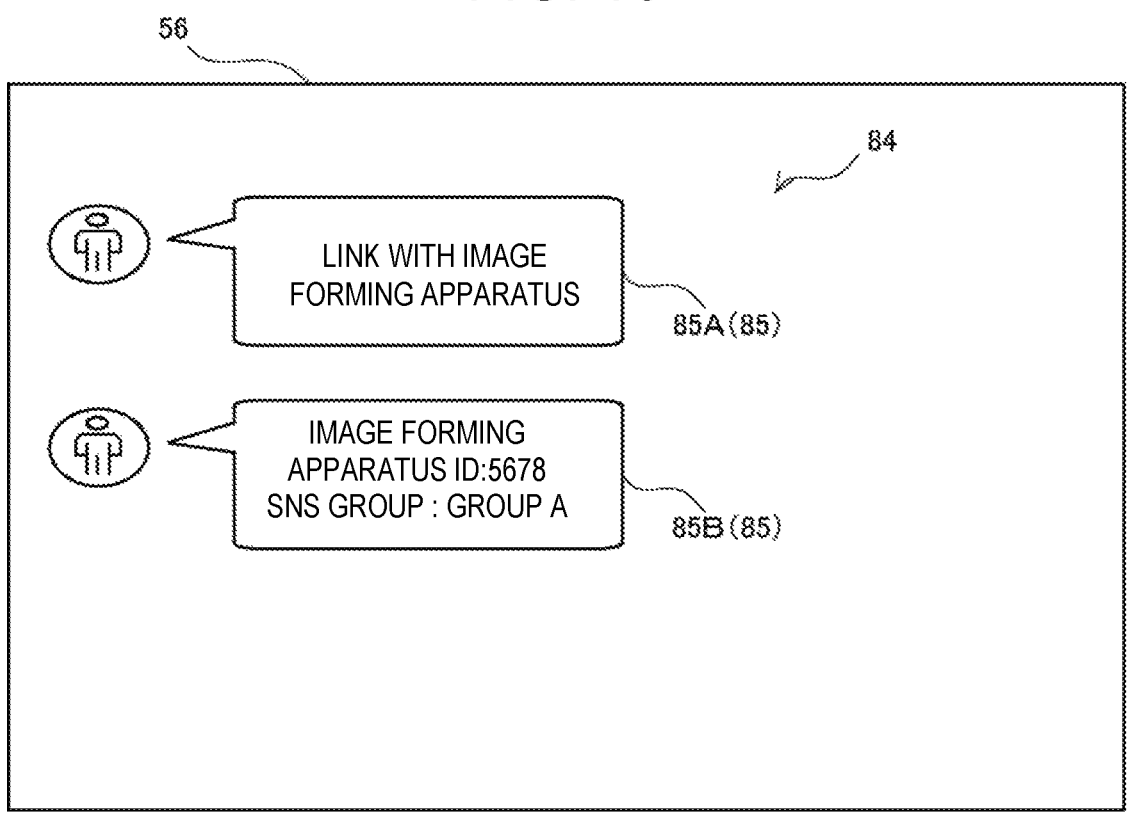
FIG. 10 is a second display example displayed on the display of the user terminal.

FIG. 10 is a second display example displayed on the display 56 of the user terminal 50. In the display example illustrated in FIG. 10, a talk room 84 is displayed as a service menu of the SNS on which a user using the SNS may post messages, still images, moving images and others. As an example, the CPU 71 causes the display 56 to display the talk room 84, when a predetermined icon displayed on the screen of the display 56 is selected using the input unit 55.

In the talk room 84, post information 85 that represents information posted by each user may be displayed. As an example, in FIG. 10, post information 85A that represents a message "Link with the image forming apparatus" and post information 85B that represents a message "Image forming apparatus ID: 5678, SNS group: Group A" are displayed as the post information 85. The post information 85A and the post information 85B are posted by the user through the user terminal 50.

Here, when predetermined information is posted in the talk room 84, the CPU 71 of the management server 70 executes a process according to the posted information. As an example, when the post information 85A and the post information 85B illustrated in FIG. 10 are posted by the user through the user terminal 50, the CPU 71 transmits a linkage request to the image forming apparatus 20 with the image forming apparatus ID "5678". The linkage request includes "5678" represented by the post information 85B as identification information and "Group A" represented by the post information 85B as group information. Accordingly, for example, when the predetermined information is posted in the talk room 84 through the user terminal 50, the linkage request is transmitted from the management server 70 to the image forming apparatus 20, including the identification information and the group information that correspond to the posted information.

Figure 11:
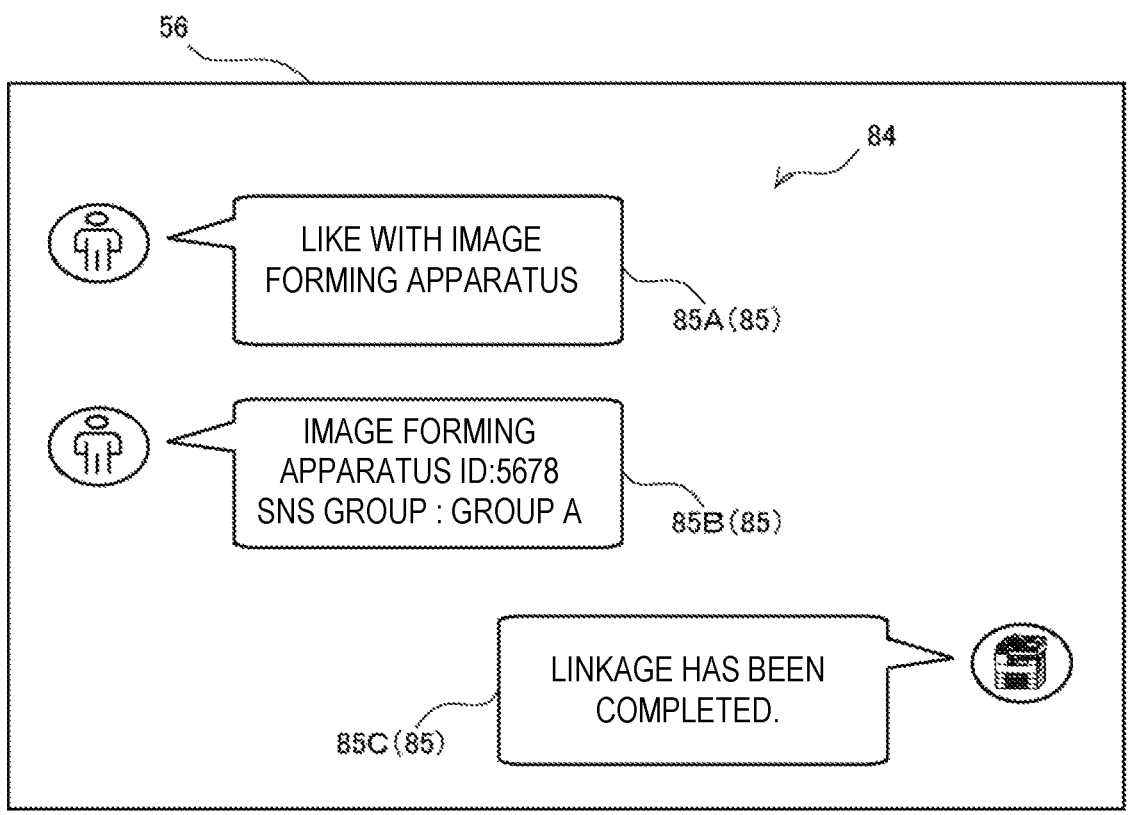
FIG. 11 is a third display example displayed on the display of the user terminal.

FIG. 11 is a third display example displayed on the display 56 of the user terminal 50. The display example illustrated in FIG. 11 represents a state after the linkage between the SNS and the image forming apparatus 20 is completed. As an example, the CPU 71 causes the display 56 to display the display example illustrated in FIG. 11 when the linkage between the SNS and the image forming apparatus 20 is completed.

In the talk room 84 illustrated in FIG. 11, post information 85C that represents a message "The linkage has been completed" is displayed as the post information 85, in addition to the post information 85A and the post information 85B. The post information 85C is automatically posted by the CPU 71 when the linkage between the SNS and the image forming apparatus 20 is completed.

Next, in the image forming apparatus 20 linked with the SNS, the flow in which the user who uses the image forming apparatus 20 is authenticated using the SNS user information will be described.

Figure 12A:
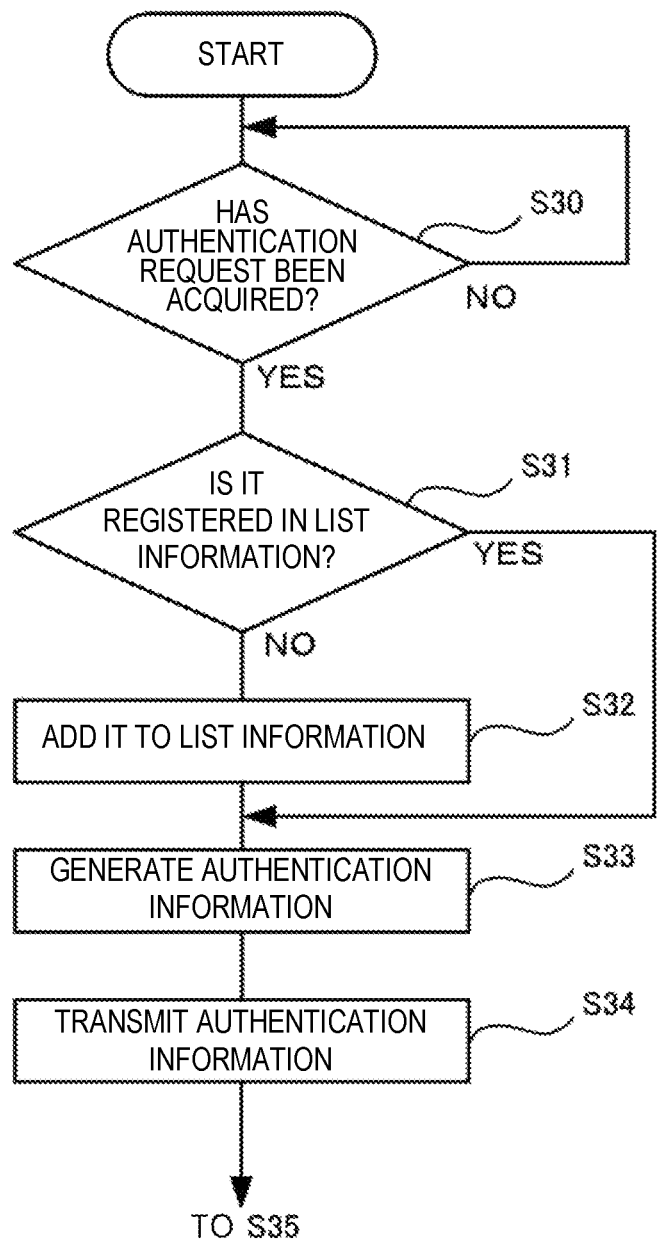
FIGS. 12A and 12B are a flowchart of a first authenticating process.
Figure 12B:
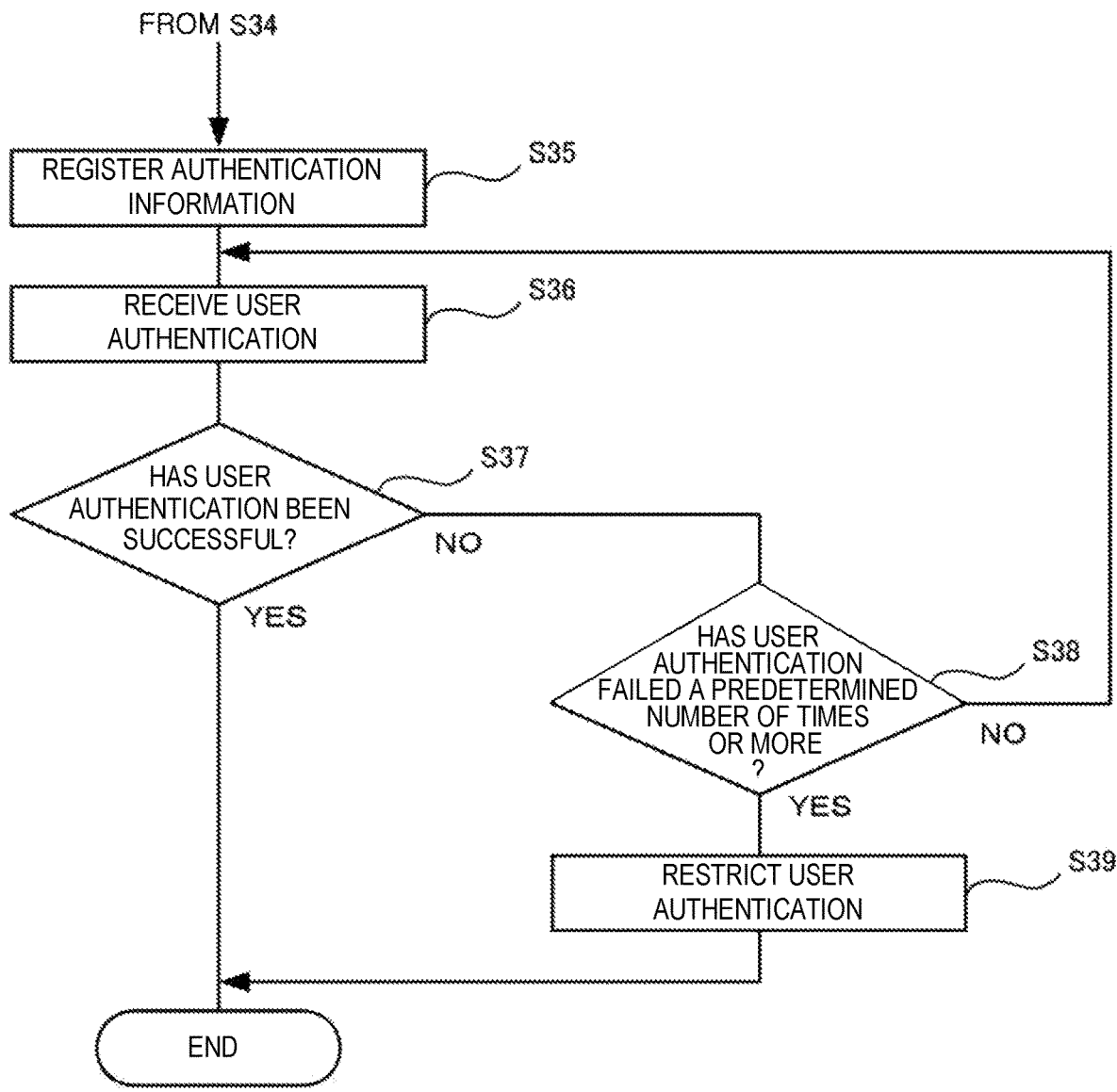

FIGS. 12A and 12B are a flowchart of a process executed by the image forming apparatus 20, in the authenticating process for authenticating the user who uses the image forming apparatus 20 using the SNS user information (hereinafter, referred to as a "first authenticating process"). The first authenticating process is performed in the manner that the CPU 31 reads the image forming program from the ROM 32 or the storage 35, and deploys the program in the RAM 33 to execute the program.

In step S30, the CPU 31 determines whether an authentication request has been acquired from a user who belongs to the SNS group registered in the image forming apparatus 20 (hereinafter, referred to as a "group user"), and when it is determined that the authentication request has been acquired (step S30: YES), the process proceeds to step S31. Meanwhile, when it is determined that the authentication request has not been acquired (step S30: NO), the CPU 31 waits until the authentication request is acquired. While the details will be described later, the authentication request includes information that may uniquely identify the group user who has transmitted the authentication request, and includes, for example, the "SNS user ID" and the "SNS group" in the present exemplary embodiment.

In step S31, the CPU 31 determines whether the group user who has transmitted the authentication request is registered in the list information, and when it is determined that the group user is not registered in the list information (step S31: NO), the process proceeds to step S32. Meanwhile, when the CPU 31 determines that the group user is registered in the list information (step S31: YES), the process proceeds to step S33. As an example, when the SNS user ID included in the authentication request is not registered in the list information, that is, when the group user is a new user, the CPU 31 determines that the group user is not registered in the list information.

In step S32, the CPU 31 registers the group user determined not to be registered in the list information in step S31, in the list information. Then, the process proceeds to step S33. As an example, the CPU 31 updates the registered contents of the list information stored in the storage 35, using the SNS user ID included in the authentication request as the SNS user information of the group user and associating the SNS user information with the SNS group included in the authentication request.

In step S33, the CPU 31 generates authentication information that enables the group user who has transmitted the authentication request to be authenticated in the image forming apparatus 20. Then, the process proceeds to step S34. The authentication information includes a one-time password that is valid only once, and a validity period for which the one-time password is valid. As an example, the CPU 31 generates a four-digit number by randomly combining four numbers "1", "2", "3", and "4", as the one-time password. Further, in the present exemplary embodiment, the validity period is set to "5 minutes" after the generation of the one-time password.

In step S34, the CPU 31 transmits the authentication information generated in step S33, specifically, the one-time password to the management server 70. Then, the process proceeds to step S35.

In step S35, the CPU 31 registers the authentication information generated in step S33. Then, the process proceeds to step S36. As an example, the CPU 31 stores the one-time password generated in step S33 in association with the SNS user information of the group user who has transmitted the authentication request, in the storage 35.

In step S36, the CPU 31 starts receiving the user authentication using the SNS user information from the group user who has transmitted the authentication request. Then, the process proceeds to step S37. As an example, when the reception of the user authentication is started, the CPU 31 causes the display 36 to display the display example illustrated in FIG. 13.

Figure 13:
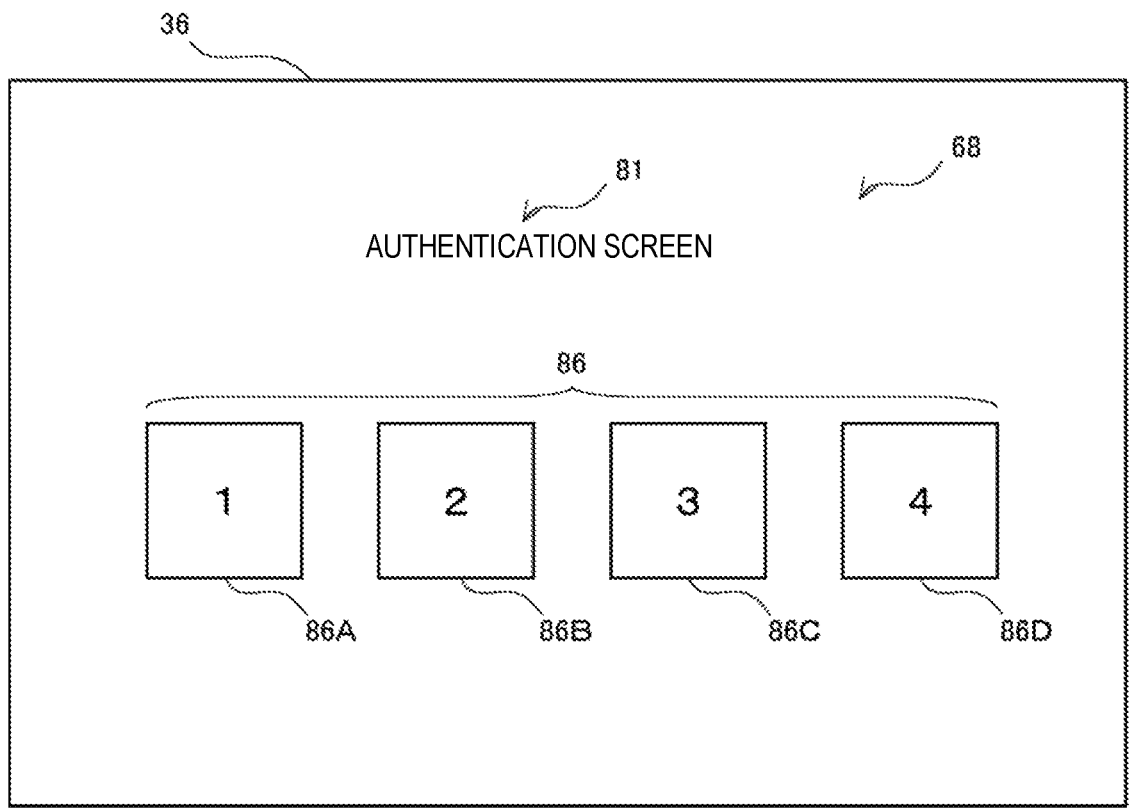
FIG. 13 is a fourth display example displayed on the display of the image forming apparatus.

FIG. 13 is a fourth display example displayed on the display 36 of the image forming apparatus 20. In the display example illustrated in FIG. 13, an authentication screen 68 for causing the user to enter the password is displayed.

The authentication screen 68 displays the message information 81, and an input button 86 that receives the input of the password. As an example, in FIG. 13, an "authentication screen" is displayed as the message information 81. Further, the input button 86 is provided with input buttons 86A, 86B, 86C, and 86D having the rectangular frames in which four numbers "1", "2", "3", and "4" are displayed, respectively. Then, the password is input when the input buttons 86A, 86B, 86C, and 86D are operated by the group user who has transmitted the authentication request.

Referring back to FIGS. 12A and 12B, in step S37, the CPU 31 determines whether the user authentication using the SNS user information is successful by the input password, and when it is determined that the user authentication is successful (step S37: YES), the process is ended. Meanwhile, when the CPU 31 determines that the user authentication fails (step S37: NO), the process proceeds to step S38. As an example, if the input password matches the one-time password transmitted to the management server 70 in step S34 within the validity period of the one-time password, the CPU 31 determines that the user authentication is successful. Meanwhile, when the input password does not match the one-time password, or when the input password matches the one-time password but the validity period of the one-time password has expires, the CPU 31 determines that the user authentication fails.

In step S38, the CPU 31 determines whether the number of times that the user authentication using the SNS user information has consecutively failed is equal to or more than a predetermined number of times, and when it is determined that the number of failing times is equal to or more than the predetermined number of times (step S38: YES), the process proceeds to step S39. Meanwhile, when the CPU 31 determines that the number of failing times is not equal to or more than the predetermined number of times (step S38: NO), the process returns to step S36. In the present exemplary embodiment, the predetermined number of times is set to, for example, "5 times".

In step S39, the CPU 31 temporarily restricts the reception of the user authentication from the group user who has transmitted the authentication request. Then, the process is ended. During the restriction of the reception of the user authentication, the CPU 31 does not execute the first authenticating process illustrated in FIGS. 12A and 12B even when an authentication request is transmitted from the group user restricted from the user authentication. Meanwhile, as an example, the CPU 31 releases the restriction after "5 minutes" elapses from the restriction of the reception of the user authentication.

Figure 14:
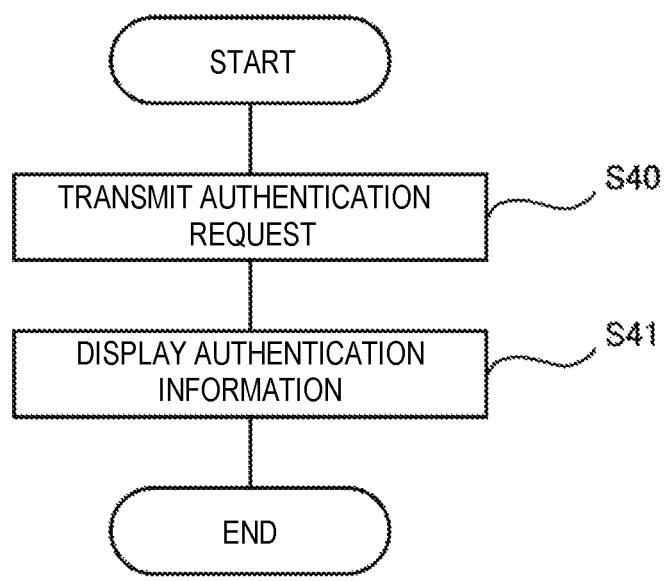
FIG. 14 is a flowchart of a second authenticating process.

FIG. 14 is a flowchart of a process executed by the management server 70 in the authenticating process (hereinafter, referred to as a "second authenticating process"). The second authenticating process is performed in the manner that the CPU 71 reads the program from the ROM 72 or the storage 74, and deploys the program in the RAM 73 to execute the program.

In step S40 illustrated in FIG. 14, the CPU 71 transmits the authentication request to the image forming apparatus 20. Then, the process proceeds to step S41. As an example, the authentication request includes at least the "SNS user ID" and the "SNS group" that correspond to the group user who transmits the authentication request.

Figure 15:
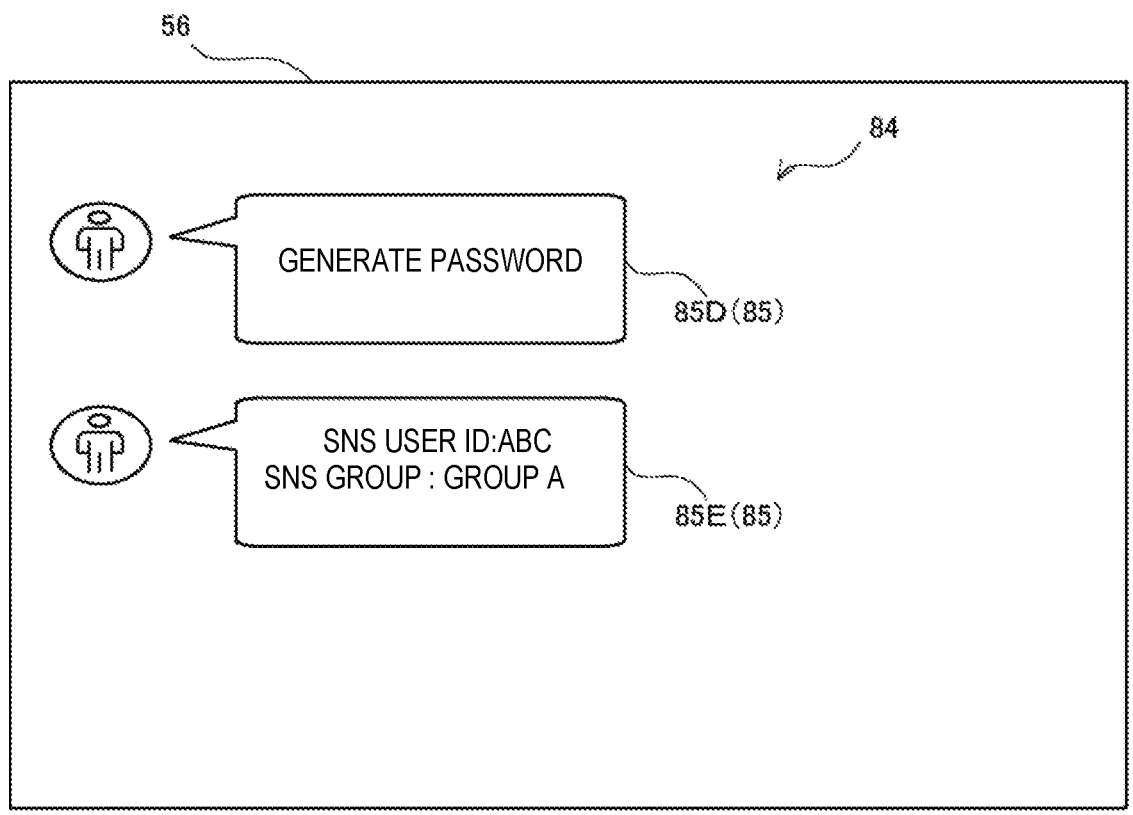
FIG. 15 is a fourth display example displayed on the display of the user terminal.

FIG. 15 is a fourth display example displayed on the display 56 of the user terminal 50. In the display example illustrated in FIG. 15, the talk room 84 is displayed as in the display examples illustrated in FIGS. 10 and 11.

In the talk room 84 illustrated in FIG. 15, post information 85D that represents a message "Generate password" and post information 85E that represents a message "SNS user ID: ABC, SNS group: Group A" are displayed as the post information 85. The post information 85D and the post information 85E are posted by the user through the user terminal 50.

As an example, when the post information 85D and the post information 85E illustrated in FIG. 15 are posted by the user through the user terminal 50, the CPU 71 transmits the authentication request to the image forming apparatus 20. The authentication request includes "ABC" represented by the post information 85E as the SNS user ID and "Group A" represented by the post information 85E as the SNS group. Accordingly, as an example, when the predetermined information is posted in the talk room 84 through the user terminal 50, the authentication request is transmitted from the management server 70 to the image forming apparatus 20, including the SNS user ID and the SNS group that correspond to the posted information.

Referring back to FIG. 14, in step S41, the CPU 71 causes the display 56 to display the authentication information generated by and transmitted from the image forming apparatus 20, specifically, the one-time password. Then, the process is ended.

Figure 16:
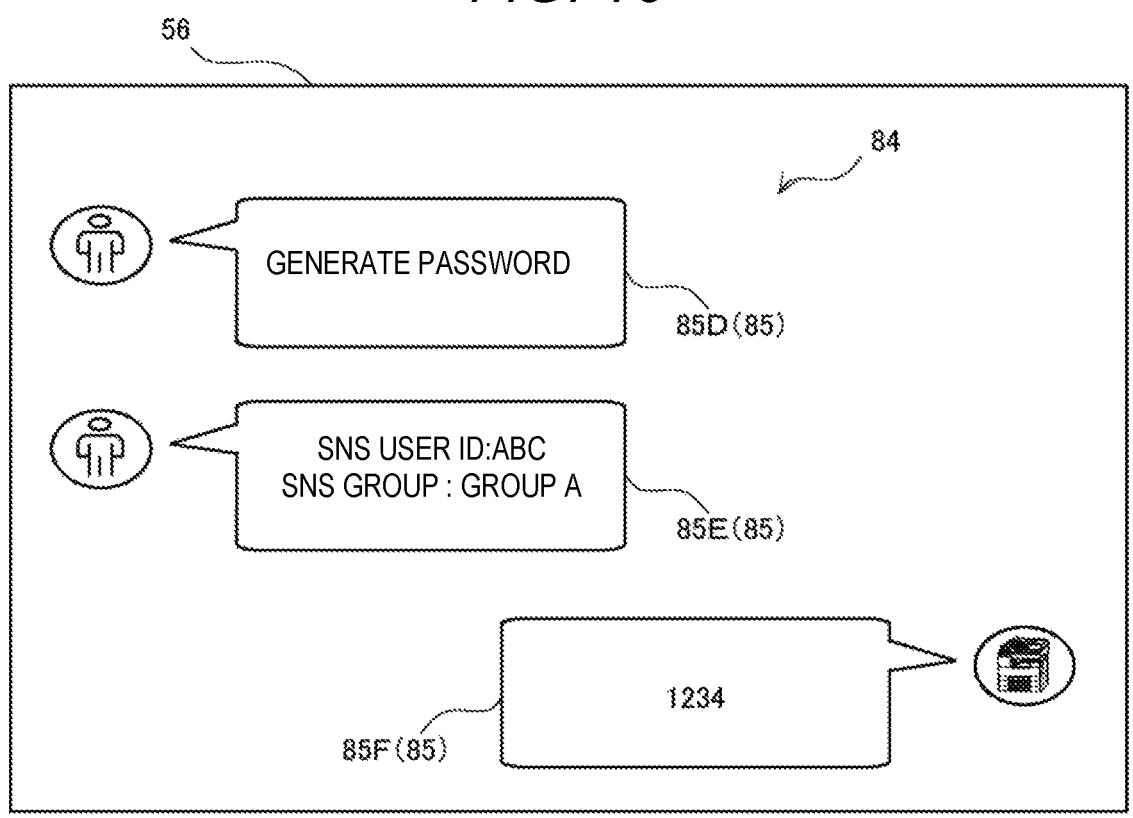
FIG. 16 is a fifth display example displayed on the display of the user terminal.

FIG. 16 is a fifth display example displayed on the display 56 of the user terminal 50. The display example illustrated in FIG. 16 represents a state after the authentication information is transmitted to the management server 70. As an example, when the authentication information generated by the image forming apparatus 20, specifically, the one-time password is acquired, the CPU 71 causes the display 56 to display the display example illustrated in FIG. 16.

In the talk room 84 illustrated in FIG. 16, post information 85F that represents a message "1234" is displayed as the post information 85, in addition to the post information 85D and the post information 85E. The post information 85F is automatically posted by the CPU 71 when the management server 70 acquires the one-time password generated by the image forming apparatus 20.

Figure 17:
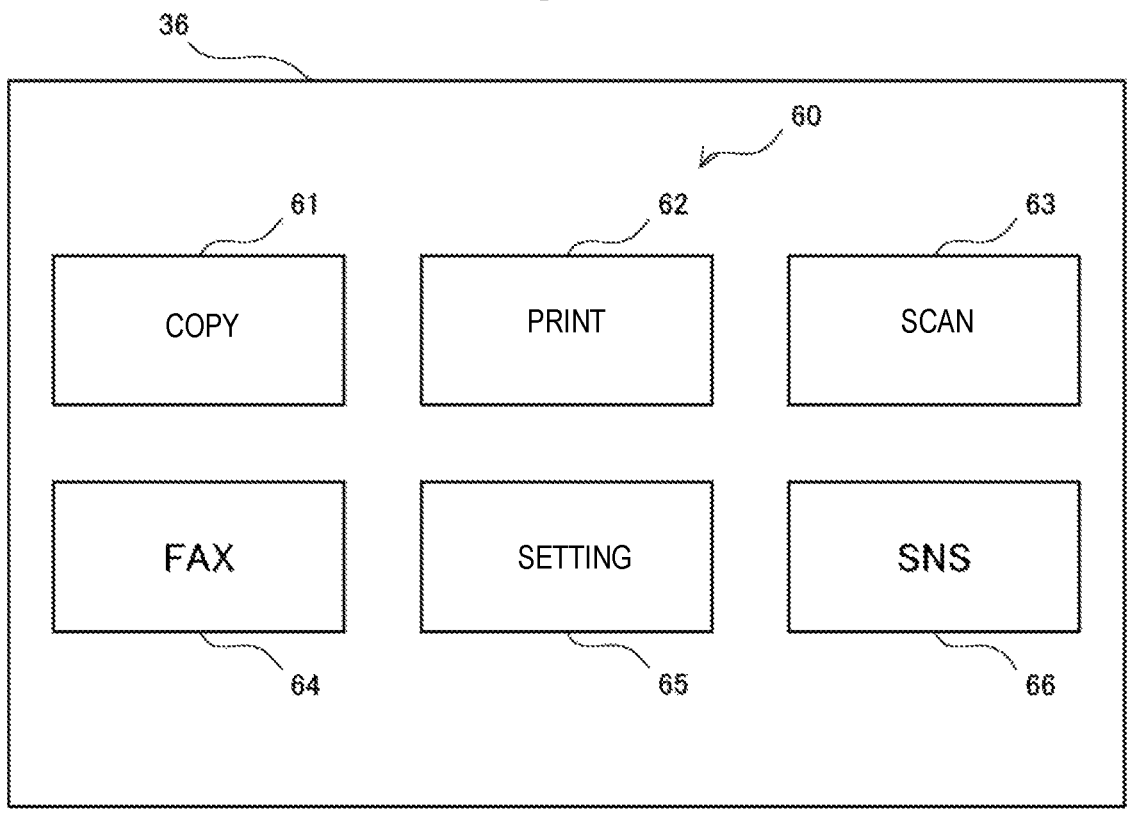
FIG. 17 is a fifth display example displayed on the display of the image forming apparatus.

Here, when the group user who has transmitted the authentication request has been successful in the user authentication using the SNS user information, the CPU 31 causes the display 36 to display the home screen 60 illustrated in FIG. 17.

FIG. 17 is a fifth display example displayed on the display 36 of the image forming apparatus 20. The display example illustrated in FIG. 17 represents a state after the group user who has transmitted the authentication request has been successful in the user authentication of the image forming apparatus 20.

In the display example illustrated in FIG. 17, the key mark 67 is deleted, which is displayed in a superposed manner on each of the copy button 61, the print button 62, the scan button 63, and the fax button 64 in the display examples illustrated in FIGS. 5 and 6 before the group user is authenticated in the image forming apparatus 20. As a result, when any of the copy button 61, the print button 62, the scan button 63, and the fax button 64 is operated during the display of the display example illustrated in FIG. 17, the CPU 31 executes the various functions that correspond to the operated buttons.

Here, when any of the copy function, the print function, the scan function, and the fax function is executed, the CPU 31 transmits use history information that represents the use history of the executed functions, to the management server 70. The use history information includes, for example, the SNS user ID of the group user who uses the various functions, the number of recording media such as papers used for the copying by the copy function, and the time when the copy function is executed.

The management server 70 acquires the use history information transmitted from the image forming apparatus 20, and stores the use history information in the storage 74 in association with the SNS user information that corresponds to the SNS user ID included in the use history information. The use history information stored in the storage 74 is displayed on the display 56 of the user terminal 50 using a predetermined service menu of the SNS through the user terminal 50. Further, in the present exemplary embodiment, contents of the use history information that may be viewed by one user (for example, an administrator user) and another user (for example, an ordinary user) among users who use the SNS are different from each other. As an example, one user may view a list screen 87 that displays a list of use history information of multiple users, differently from another user.

Figure 18:
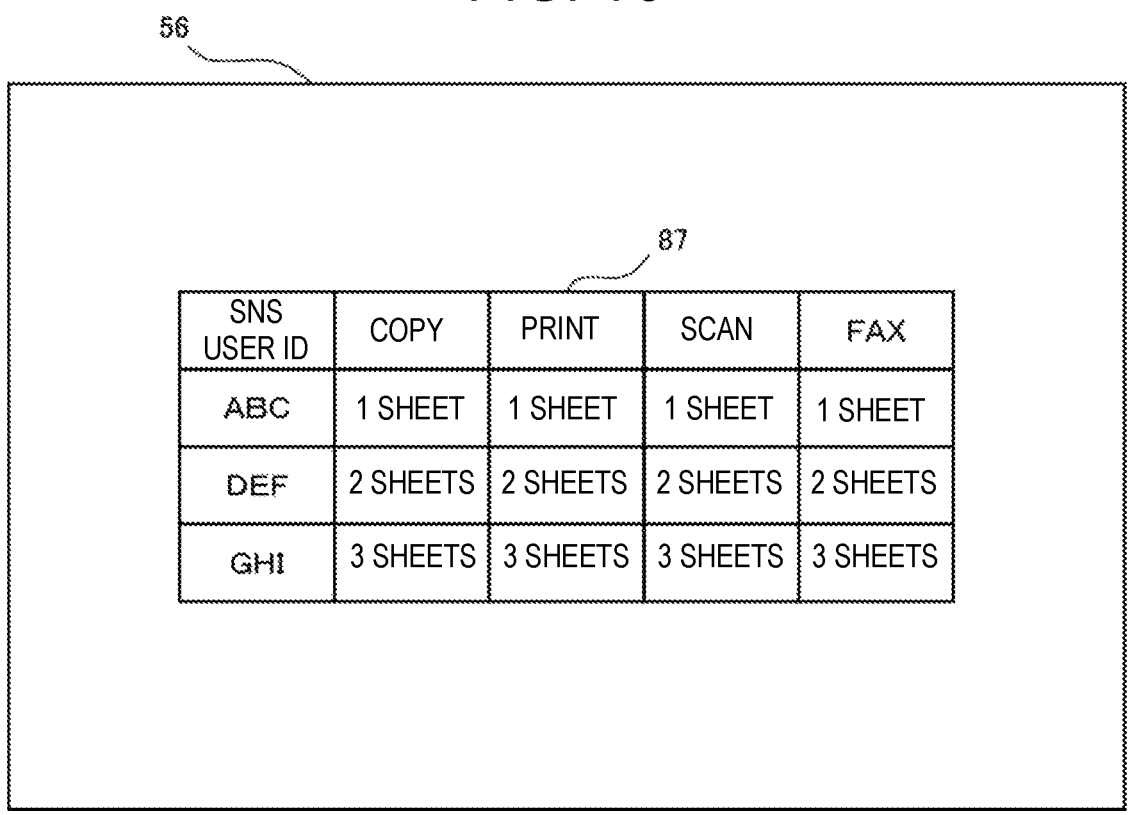
FIG. 18 is a sixth display example displayed on the display of the user terminal.

FIG. 18 is a sixth display example displayed on the display 56 of the user terminal 50. The display example illustrated in FIG. 18 displays the list screen 87 that may be viewed by one user. As an example, the CPU 71 causes the user terminal 50 of one user to display the list screen 87, when a predetermined icon displayed on the screen of the display 56 is selected using the input unit 55.

The list screen 87 displays the use history information of the various functions associated with each user for each row. As the various functions, use history information of the copy function, the print function, the scan function, and the fax function is displayed. In FIG. 18, as an example, the use history information confirms that the user associated with the SNS user ID: ABC performs a copying of one sheet with the copy function, performs a printing of one sheet with the print function, performs a scanning of one sheet with the scan function, and performs a faxing of one sheet with the fax function.

Figure 19:
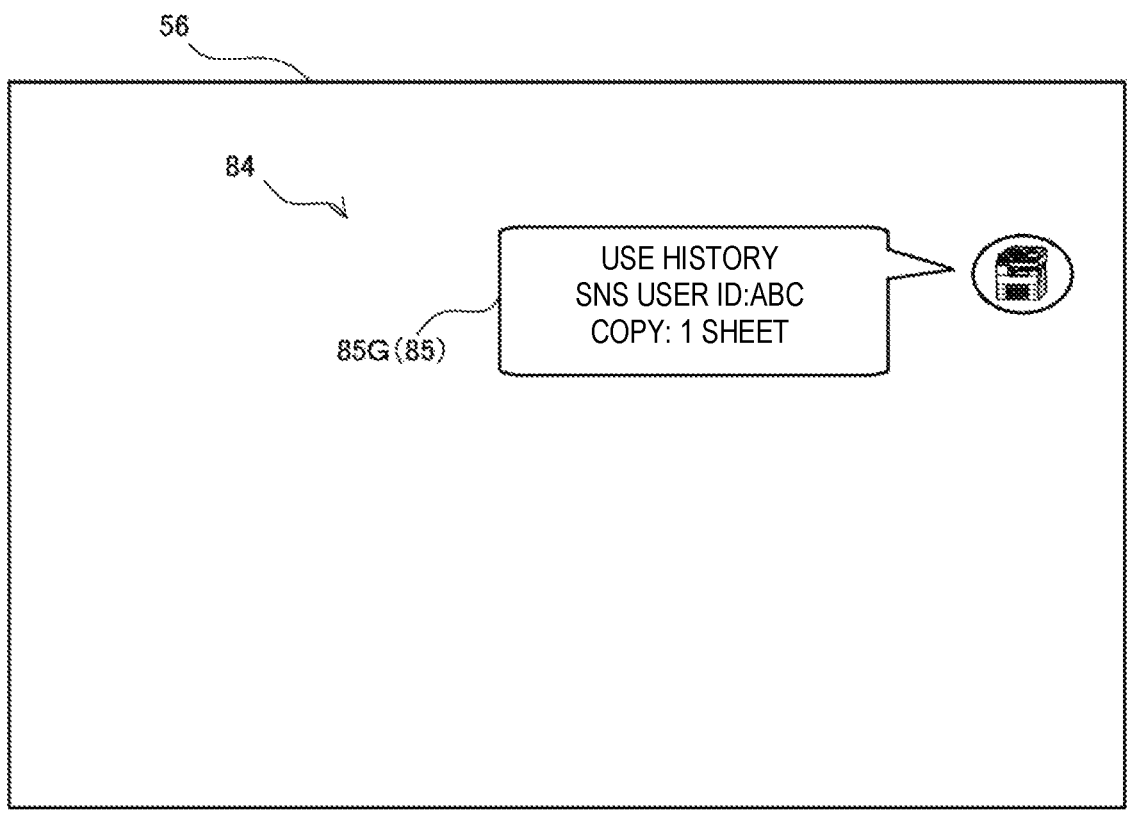
FIG. 19 is a seventh display example displayed on the display of the user terminal.

FIG. 19 is a seventh display example displayed on the display 56 of the user terminal 50. In the display example illustrated in FIG. 19, the use history information is displayed as post information 85G in the talk room 84. As an example, the CPU 71 causes the display 56 to display the post information 85G when the use history information transmitted from the image forming apparatus 20 is acquired.

In the talk room 84 illustrated in FIG. 19, as an example, a message "Use history SNS user ID: ABC, Copy: 1 page" is displayed as the post information 85G.

Here, as described above, the user authentication may be performed when the copy function, the print function and others of the image forming apparatus 20 are used.

Further, in recent years, the SNS has been used in business. Further, the SNS user information is registered in the management server 70 that manages the SNS. When the user authentication is performed using the SNS user information, the burden of, for example, managing users who are permitted to use the image forming apparatus 20 by manually inputting the user information to the image forming apparatus 20 is reduced.

Accordingly, in the present exemplary embodiment, the CPU 31 executes the linking application, receives the linkage request from the user through the SNS, and performs the first authenticating process using the user information on the user who uses the SNS linked as a result of the approval of the received linkage request (specifically, SNS user information). The first authenticating process is an example of an "authenticating process". Thus, according to the present exemplary embodiment, the user authentication in the image forming apparatus 20 may be performed using the SNS user information.

In the present exemplary embodiment, the CPU 31 performs an updating process for updating the list information registered in the image forming apparatus 20 using the SNS user information during the first authenticating process. As an example, the CPU 31 performs the updating process during steps S31 and S32 of the first authenticating process illustrated in FIGS. 12A and 12B. Thus, according to the present exemplary embodiment, the first authenticating process is performed, accompanied by the updating process.

In the present exemplary embodiment, when the group user who has transmitted the authentication request is not registered in the list information, the CPU 31 adds the group user to the list information in the updating process. The group user who has transmitted the authentication request is an example of a "specific user identified by user information". Thus, according to the present exemplary embodiment, the process load of the updating process is reduced, as compared with a configuration in which the group user who has transmitted the authentication request is added to the list information in the updating process, regardless of whether or not the user is registered in the list information.

In the present exemplary embodiment, if the adding of the group user who has transmitted the authentication request to the list information in the updating process causes the number of registered users to exceed the number of users that may be registered in the list information, the CPU 31 deletes a user who meets a predetermined condition from the list information, and then, adds the group user to the list information. In the present exemplary embodiment, the user who meets the predetermined condition is defined as a user for whom a use setting has not been made.

As an example, when the number of users that may be registered in the list information is "100", and when the number of users registered in the list information reaches "100", the CPU 31 deletes the registration of one user for whom a use setting has not been made from the list information in the updating process, and then, adds the group user who has transmitted the authentication request to the list information. With this configuration, according to the present exemplary embodiment, a user having the usability of the image forming apparatus 20 that does not change before and after the deletion is deleted. Thus, according to the present exemplary embodiment, the usability of the image forming apparatus 20 may be improved, as compared with a configuration in which a randomly selected user is deleted from the list information, and then, the group user who has transmitted the authentication request is added to the list information.

In the present exemplary embodiment, each time the first authenticating process is performed, the CPU 31 notifies the management server 70 of the authentication information generated for each first authenticating process, through the SNS. Thus, according to the present exemplary embodiment, the possibility of forgetting the authentication information is reduced, as compared with a configuration in which the authentication information generated in the first authenticating process is not notified to the management server 70 through the SNS.

In the present exemplary embodiment, when it is determined that the received password matches the one-time password within the validity period of the one-time password notified as the authentication information to the management server 70 through the SNS, the CPU 31 authenticates the group user who has transmitted the authentication request to the image forming apparatus 20. Thus, according to the present exemplary embodiment, the confidentiality of the first authenticating process may be improved, as compared with a configuration in which a user who uses the image forming apparatus 20 is authenticated using a fixed password in the first authenticating process.

In the present exemplary embodiment, the CPU 31 causes the display 36 of the image forming apparatus 20 to display identification information, and receives the linkage request including the identification information from the user through the SNS. Thus, according to the present exemplary embodiment, the image forming apparatus 20 that is usable by the user may be recognized.

In the present exemplary embodiment, if an external service which has been already linked with the SNS is also linkable with the image forming apparatus 20, the CPU 31 receives a connection from the image forming apparatus 20 to the external service using the SNS user information. An example of the external service may be a cloud storage. In this case, when the user authentication using the SNS user information is being successful, the connection from the image forming apparatus 20 to the cloud storage becomes possible. As a result, in the image forming apparatus 20, photos or the like stored in the cloud storage may be printed by the user who uses the SNS. With this configuration, according to the present exemplary embodiment, the external service may be used through the image forming apparatus 20 using the SNS user information.

Miscellaneous

In the exemplary embodiment above, the user authentication using the SNS user information is described as an example. However, a further user authentication of the image forming apparatus 20 may be provided. As an example, in addition to the user authentication using the SNS user information, a user authentication using an integrated circuit (IC) card, a face authentication or the like may be performed by the image forming apparatus 20.

In the exemplary embodiment above, the SNS user information transmitted from the management server 70 to the image forming apparatus 20 includes the SNS user ID. However, without being limited thereto, the SNS user information may include an SNS user ID and an SNS password.

In the exemplary embodiment above, the CPU 71 of the management server 70 unconditionally transmits the SNS user information when the transmission request for the SNS user information is acquired from the image forming apparatus 20. However, the SNS user information may be transmitted, when a predetermined condition is satisfied. As an example, when the transmission request for the SNS user information is acquired, and thereafter, an approval instruction is input by the user who manages the management server 70, the CPU 71 may determine that the predetermined condition is satisfied.

In the exemplary embodiment above, the image forming apparatus 20 and the user terminal 50 communicate with each other via the management server 70 without directly communicating with each other, in the linking system 10. However, without being limited thereto, the image forming apparatus 20 and the user terminal 50 may directly communicate with each other using a short-range wireless communication or the like, in the linking system 10.

In the linking system 10 of the exemplary embodiment above, when the communication between the image forming apparatus 20 and the user terminal 50 via the network N (hereinafter, referred to as a "network communication") is not possible, the user authentication of the image forming apparatus 20 may be performed according to the following method.

In the case described above, when the network communication between the image forming apparatus 20 and the management server 70 is possible, the CPU 31 of the image forming apparatus 20 receives a selection of a desired SNS group in the list information stored in the storage 35 by an operation of the display 36. Thereafter, if a user ID and a password input on the screen displayed on the display 36 match the SNS user ID and the SNS password stored in the storage 74 of the management server 70, the CPU 31 determines that the user authentication is successful.

Meanwhile, in the case described above, when the network communication between the image forming apparatus 20 and the management server 70 is not possible, but the SNS user ID and the SNS password are stored in the storage 35 of the image forming apparatus 20, the CPU 31 performs the following process. Specifically, if the user ID and the password input on the screen displayed on the display 36 match the SNS user ID and the SNS password stored in the storage 35, the CPU 31 determines that the user authentication is successful.

Further, in the case described above, when the network communication between the image forming apparatus 20 and the management server 70 is not possible, but only the SNS user ID is stored in the storage 35 of the image forming apparatus 20, the CPU 31 performs the following process. Specifically, if the user ID input on the screen displayed on the display 36 matches the SNS user ID stored in the storage 35, the CPU 31 determines that the user authentication is successful. In this case, the CPU 31 may restrict the user who has been successful in the user authentication from using a portion of the various functions provided in the image forming apparatus 20. As an example, the CPU 31 may restrict the use of the fax function accompanied by an output to the outside.

In the case described above, if the network communication between the user terminal 50 and the management server 70 is possible, and information acquired by the short-range wireless communication between the image forming apparatus 20 and the user terminal 50 matches the predetermined information at the time of the user authentication, the CPU 31 determines that the user authentication is successful.

Meanwhile, the CPU 31 determines that the user authentication fails, if none of the cases described above is met.

In the exemplary embodiment, the CPU 31 performs the updating process during the first authenticating process. However, the CPU 31 may periodically acquire the SNS user information from the management server 70 to update the list information stored in the storage 35. Further, when the SNS user information is added to or deleted from the list information by an operation of the user, the CPU 31 updates the list information according to the operation contents of the user.

In the exemplary embodiment, the user who meets the predetermined condition is a user for whom a use setting has not been performed. However, the present disclosure is not limited thereto. As an example, the user who meets the predetermined condition may be a user who remains for the longest time from the success in the previous user authentication, a user who uses the image forming apparatus 20 least frequently per unit time, or a user who is registered on the earliest data in the list information.

In the exemplary embodiment, when the user who has been successful in the user authentication belongs to multiple SNS groups, and when the user has been successful in the user authentication for a certain SNS group, the CPU 31 provides the authority to use information on all of the SNS groups to which the user belongs. As an example, when the user who belongs to Groups A and B has been successful in the user authentication for Group A, the CPU 31 permits the user to perform a fax transmission to a user who belongs to Group B.

In the linking system 10 of the exemplary embodiment, the following example may be considered as a method of performing a printing using the image forming apparatus 20.

As an example, in a state where the user authentication using the SNS user information is successful, when "photos, documents, etc., to be printed" and an "instruction for a printing to the image forming apparatus 20" are posted as the post information 85 in the talk room 84, the printing is performed by the image forming apparatus 20.

As another example, in a state where the user authentication using the SNS user information is successful, when an instruction to print a screen of a Web browser is received, the printing is performed by the image forming apparatus 20.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
execute a linking application for a linkage with a specific service comprising a social network (SNS), to receive a linkage request from a user through the SNS; and
perform an authenticating process that authenticates a user who uses the image forming apparatus, using user information on the user who uses the SNS linked as a result of an approval of the received linkage request;

if an external service which has been already linked with the SNS is linkable with the image forming apparatus, receive a connection from the image forming apparatus to the external service using the user information; and during the authenticating process, perform an updating process that updates list information using the user information, the list information representing a list of users who use the image forming apparatus, the list information being stored in the image forming apparatus.

2. The image forming apparatus according to claim 1, wherein the processor is configured to, when a specific user identified by the user information is not registered in the list information, add the specific user to the list information in the updating process.

3. The image forming apparatus according to claim 2, wherein the processor is configured to, if the adding of the specific user to the list information in the updating process causes the number of users registered in the list information to exceed the allowable number of users registered in the list information, delete a user who meets a predetermined condition, and then, add the specific user to the list information.

4. The image forming apparatus according to claim 3, wherein the user who meets the predetermined condition is a user for whom a use setting related to using the image forming apparatus has not been made.

5. The image forming apparatus according to claim 4, wherein the processor is configured to, each time the authenticating process is performed, notify the specific service of authentication information that is generated for each authenticating process and that enables the specific user identified by the user information to be authenticated in the image forming apparatus.

6. The image forming apparatus according to claim 5, wherein the authentication information comprises
a one-time password which is valid only once, and
a validity period for which the one-time password is valid, and the processor is configured to, if a received password matches the one-time password within the validity period of the one-time password notified to the specific service, authenticate the specific user for the image forming apparatus.

7. The image forming apparatus according to claim 3, wherein the processor is configured to, each time the authenticating process is performed, notify the specific service of authentication information that is generated for each authenticating process and that enables the specific user identified by the user information to be authenticated in the image forming apparatus.

8. The image forming apparatus according to claim 7, wherein the authentication information comprises
a one-time password which is valid only once, and
a validity period for which the one-time password is valid, and the processor is configured to, if a received password matches the one-time password within the validity period of the one-time password notified to the specific service, authenticate the specific user for the image forming apparatus.

9. The image forming apparatus according to claim 2, wherein the processor is configured to, each time the authenticating process is performed, notify the specific service of authentication information that is generated for each authenticating process and that enables the specific user identified by the user information to be authenticated in the image forming apparatus.

10. The image forming apparatus according to claim 9, wherein the authentication information comprises
a one-time password which is valid only once, and
a validity period for which the one-time password is valid, and the processor is configured to, if a received password matches the one-time password within the validity period of the one-time password notified to the specific service, authenticate the specific user for the image forming apparatus.

11. The image forming apparatus according to claim 1, wherein the processor is configured to, each time the authenticating process is performed, notify the specific service of authentication information that is generated for each authenticating process and that enables a specific user identified by the user information to be authenticated in the image forming apparatus.

12. The image forming apparatus according to claim 11, wherein the authentication information comprises
a one-time password which is valid only once, and
a validity period for which the one-time password is valid, and the processor is configured to, if a received password matches the one-time password within the validity period of the one-time password notified to the specific service, authenticate the specific user for the image forming apparatus.

13. The image forming apparatus according to claim 1, wherein the processor is configured to:
display identification information for identifying the image forming apparatus linked with the specific service; and
receive the linkage request including the identification information from the user through the specific service.

14. A non-transitory computer readable medium storing a program that causes a computer to execute information processing, the information processing comprising:

executing a linking application for a linkage with a social network service (SNS), to receive a linkage request from a user through the SNS; and performing an authenticating process that authenticates a user who uses an image forming apparatus, using user information on the user who uses the SNS linked as a result of an approval of the received linkage request;

if an external service which has been already linked with the SNS is linkable with the image forming apparatus, receive a connection from the image forming apparatus to the external service using the user information; and during the authenticating process, perform an updating process that updates list information using the user information, the list information representing a list of users who use the image forming apparatus, the list information being stored in the image forming apparatus.

15. A linking system comprising:

a processor configured to:

execute a linking application for linking a terminal of a social network service(SNS), and an image forming apparatus with each other through the SNS, to cause the image forming apparatus to receive a linkage request from a user through the SNS; and perform an authenticating process that authenticates a user who uses the image forming apparatus, using user information on the user who uses the SNS linked as a result of an approval of the received linkage request, the user information being stored in the terminal of the SNS;

if an external service which has been already linked with the SNS is linkable with the image forming apparatus, receive a connection from the image forming apparatus to the external service using the user information; and during the authenticating process, perform an updating process that updates list information using the user information, the list information representing a list of users who use the image forming apparatus, the list information being stored in the image forming apparatus.

* * * * *